3,303,170
TRIAZINE MODIFIED POLYPHENYLENE SULFIDE RESINS
Roscoe A. Pike, Holden, Mass., assignor to Norton Company, Worcester, Mass., a corporation of Massachusetts
No Drawing. Filed Nov. 8, 1963, Ser. No. 322,507
2 Claims. (Cl. 260—79)

This invention relates to a new organic synthetic resinous polymer having exceptional heat stability, solvent resistance, and oxidation resistance. The resins of my invention are useful as adhesives, sealing compounds, pigments, fillers, rubber compounding materials, molding powders, and binders. These resins can also be flame sprayed, in a reducing or neutral atmosphere to provide protective coatings.

Both linear and crosslinked polyphenylene sulfides containing only carbon aromatic rings have been described in the literature, for example in U.S. Patents 2,513,188 and 2,538,941 to Macallum. Such resins are made by reacting sulfur with any polyfunctional nuclearly substituted aromatic chloride, bromide or iodide such as phenyl, tolyl, naphthyl, diphenyl, and terphenyl at temperatures from 270° C. to 360° C. for several hours.

The object of the present invention is to provide a modified polyphenylene sulfide resin having more thermal stability than the prior art resins of this type. It is another object to provide a process for making such improved polymers.

It has been found that heterocyclic aromatic units containing nitrogen can be incorporated into polyphenylene sulfide resins to give resins of improved thermal characteristics. Specifically, it has been found that the halophenyltriazine unit can be incorporated into such resin systems resulting in new compositions of matter useful in high temperature applications. The structure of the triazine compounds found useful is as follows:

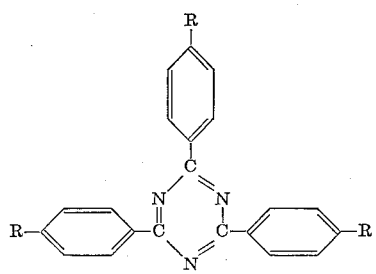

where R is hydrogen or a halogen selected from the group consisting of chlorine, bromine, and iodine but at least one R is a chlorine, bromine, or iodine radical. Where only one R is a reactive halogen then the triazine unit can take a position only at the end of polymer chains or branches. Where at least two R's are reactive the triazine unit will be present at intermediate positions throughout linear or crosslinked polymer molecules. Where all three R groups are reactive then the triazine unit can act as a cross linking center.

The unmodified polyphenylene sulfide resins can be made from nuclear substituted aromatic compounds which contain up to three nuclearly substituted halogen radicals (usually chlorine or bromine). Iodine substituted materials are perfectly suitable but such derivatives are less available than the chlorinated and brominated forms. Monosubstituted aromatic compounds may be employed but will act as endblockers so generally such materials would be employed in minor amounts, as would the monofunctional triazine materials, where reasonably high molecular weight resins are desired.

The modified polyphenylene sulfide resins of the present invention may be prepared in the same way as the prior art unmodified resins but with from 1 to 99% of the halogen substituted carbon aromatic compounds replaced by the halogenated phenyl triazine compound. Resins can also be made employing 100% of triazine compound as the polymerizable monomer. Thus the halogen substituted aromatic compound and the halogenated phenyltriazine materials together with sulfur and an alkaline or alkaline earth oxide or carbonate (preferably sodium carbonate) is heated at 280 to 325° C. for 4 to 6 hours, with a catalyst, or without a catalyst at 300° C. for 20 hours. By this method can be prepared a high molecular weight polymer insoluble in water, methanol, and toluene, having high oxidative thermal stability and a fusion point under atmospheric or molding pressure of from 150 to 350° C: or higher. The catalysts used in the catalyzed reaction include amine polysulfides, copper and nickel containing compounds, basic lead nitrosophenolate, bis-(dialkylthiocarbamyl) sulfides and disulfides, metal sulfides, metals, metal chlorides, ferrocene, and N-halocarboxylamides.

Instead of the metal oxide or carbonate, a metal sulfide can be substituted provided free sulur is still present in at least a significant amount, as taught in Example I of U.S. Patent 2,538,941. Although I can employ this type of metal sulfide reaction mix when triazine modifiers are employed, with or without catalysts, it is simpler and more economical to employ the metal oxide or carbonate instead of the preformed sulfide. Insofar as the chemistry involved, however, the mixes with the metal sulfide are equivalent to the mixes employing the oxide or carbonate, so long as free sulfur is present in both cases.

The particular portions of monofunctional, difunctional, and trifunctional components in the resins according to my invention are determined by the properties desired. In conformity with the prior art, such as U.S. Patent 2,513,188, I find that in the production of cross-linked polymers no apparent benefit results from employing more than 25 or 30 mol percent of trifunctional materials, whether the trifunctional group is in the form of a carbon aromatic or the trifunctional phenyl triazine or mixtures of both.

In order to achieve effective and significant upgrading of the thermal properties of the phenylene sulfide polymers, I prefer to employ enough of the phenyl triazine so that at least 10% of the polymer units are triazine units, however as much or as little of the halophenyltriazine may be incorporated into the reaction mix as may be desired. Thus, although the finished resin may include, numerically, from 1 to 100% of triazine nuclei, less than 10% would show only little improvement over the unmodified resin and in view of the relative cost of materials, the use of more than 50% may be uneconomical for some applications. Useful resins have been prepared, however, from 100% triazine type compounds.

An example of a typical resin of this invention, employing a trifunctional triazine is as follows:

*Example I*

Into a glass liner which was inserted into a 15 cc. steel pressure vessel was placed a well-blended mixture of:

|   | G. |
|---|---|
| p-Dichlorobenzene | 2.7 |
| Sulfur | 1.1 |
| Na$_2$CO$_3$ | 3.5 |
| Tris (p-chlorophenyl) triazine | 0.5 |

The vessel was sealed and heated at 300° C. for 20 hours. After cooling the solid product was granulated and extracted with 250 cc. portions of hot water, methanol, and toluene. The solid polymer was then dried in a vacuum oven at 60° C. for 2 hours. The weight of the dried polymer was 1.98 g.

An example of a resin containing a difunctional triazine unit is as follows:

Example II

Into a glass liner which was inserted into a 15 cc. steel pressure vessel was placed a charge consisting of:

|  | Grams |
|---|---|
| p-Dichlorobenzene | 2.2 |
| Sulfur | 1 |
| Di (p-chlorophenyl) phenyl-triazine | 0.5 |
| $Na_2CO_3$ | 3.5 |

The vessel was sealed and heated at 300° C. for 20 hours. After cooling the solid product was granulated and washed with hot water and acetone. The material was then extracted for 6 hours with toluene in a Soxhlet extractor. The solid polymer was then dried in a vacuum oven at 60° C. (1 mm. pressure) for 4 hours. The weight of polymer obtained was 1.62 grams.

Similar results were obtained when a catalyzed polymerization was run for 5 hours at 300° C. An example of a catalyzed reaction is as follows:

Example III

Into a 15 cc. steel vessel was inserted a glass liner containing a well-blended mixture of:

|  | Grams |
|---|---|
| Ferrocene | 0.077 |
| Sulfur | 1.1 |
| $Na_2CO_3$ | 3.5 |
| Tris (p-chlorophenyl) triazine | 0.5 |
| p-Dichlorobenzene | 2.7 |

After cooling, the solid product was granulated and extracted with hot water, methanol, and toluene followed by drying in a vacuum (2 mm.) oven for 2 hours at 60° C. The resulting product weighed 1.9 grams.

The following illustrates the preparation of a polyphenylenetriazine sulfide resin:

Example IV

A. In a glass liner inserted into a 15 cc. steel pressure vessel was charged:

|  | G. |
|---|---|
| Sulfur | 1.0 |
| Sodium carbonate | 3.5 |
| Di (p-chlorophenyl) phenyl triazine | 2.7 |
| Tris-(p-chlorophenyl) triazine | 0.5 |

The vessel was sealed and heated at 300° C. for 20 hours. The vessel was then cooled and the product removed from the glass liner, followed by extraction with hot water, methanol and toluene. The extracted product was dried in a vacuum oven at 80° to give 2.4 g. of a pea-green colored resin.

B. A similar run was carried out except that 0.14 g. of N-bromosuccinimide was added as catalyst and the charge was heated at 300° C. for 5 hours. After extraction as described above there was obtained 2.6 g. of resin.

Thermal oxidative stability tests were carried out in a forced draft oven to compare the stability of the triazine modified polyphenylene sulfide resins with the stability of polyphenylene sulfide resins containing no triazine units. The resins were prepared as described in Example I using the indicated quantities of reactants. The following table summarizes the results:

TABLE I.—HEAT STABILITY OF RESINS OF THIS INVENTION COMPARED TO PRIOR ART

| Polymer | Percent Wt. Loss After 20 hrs. at 250° C. | Percent Wt. Loss After 85–100 hrs. at 300° C. | Percent Wt. Loss After 20 hrs. at 400° C. | Total Wt. Loss of Sample |
|---|---|---|---|---|
| Prior Art: 2.7 g.p-dichlorobenzene, 0.5 g. 1,2,4, trichlorobenzene, 1.1 g. sulfur, 3.5 g. $Na_2CO_3$ (three separate preparations). | 0.1 | 1.34 | 12.4 | 13.84 |
|  | 0.5 | 3.9 | 14.9 | 18.4 |
|  |  | 5.1 | 14.5 | 19.4 |
| Resin of Example II (two separate preparations). |  | 1.1 | 5.7 | 6.8 |
|  | 0.1 | 1.2 | 4.6 | 6.9 |
| Resin of Example I | 0.0 | 3.3 | 5.3 | 8.6 |
| Resin of Example IV-A | 1.1 | 8.4 | ¹ 5.5 | 15 |
| Resin of Example IV-B | 0.9 | 8.9 | ¹ 6.8 | 16.6 |

¹ 20 hrs. at 350° C.

In the case of Example IV, analysis for carbon at the end of the heat cycle showed no loss. The initial carbon content was 72.5 wt. percent and was 72.4% at the end of the heating; the theoretical carbon content being 71.8%. The weight loss thus appears essentially due to loss of low molecular wieght fractions and not due to thermal degradation of the resin.

As is apparent from the foregoing, various species of resins may be produced according to this invention. Thus when a monofunctional triazine compound is employed with a difunctional carbon aromatic, such as paradichlorobenzene, the following endblocked structure would result:

$[(C_6H_5)_2C_3N_3C_6H_4S][C_6H_4S]_n[C_6H_4C_3N_3(C_6H_5)_2]$ where $C_3N_3$ stands for the triazine nucleus and $C_6H_5$ and $C_6H_4$ are phenyl and phenylene groups, respectively. The value of $n$ would depend upon the degree of polymerization and, for this endblocked polymer, $n$ would have a value betwen 1 and 50. Where $n$ is low, the polymers are useful as high temperature lubricants and heat transfer fluids.

Resins made from reaction mixes employing the difunctional triazine unit and a difunctional aromatic compound would consist of linear chains including both triazine units and carbon aromatic units throughout the chains. The empirical formula would be as follows:

$\{SC_6H_4(C_6H_5)C_3N_3C_6H_4\}_x(C_6H_4S)_y$ where $x$ can vary from 0.01 to 0.99 and $x+y=1$. The actual polymer chains can be represented as follows:

$\{S-B-S-T-S-B-S-T-S-B-S-B\}_n$ where S represents sulfur and B and T, respectively, represent the carbon aromatic units and the triazine units. When the difunctional triazine compound is employed with a difunctional aromatic compound at least some trifunctional carbon aromatic compound, such as a trichlorobenzene, the empirical formula would be as follows:

$\{SC_6H_4(C_6H_5)C_3N_3C_6H_4\}_x(C_6H_4S)_yC_6H_3S_{3/2}\}_z$ where $z$ varies from 0.01 to 0.30 and $x+y+z=1$.

The actual structure would be a three dimensional cross linked polymer a small part of which can be represented as follows:

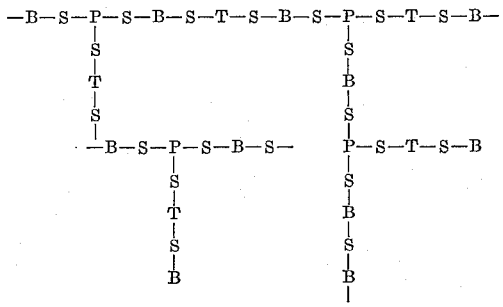

where P represents the trifunctional carbon aromatic unit, T the triazine unit and B the difunctional carbon aromatic unit. If no difunctional carbon aromatic compound is present ($y=0$) then the B's in the above representation would be replaced by T's.

When a trifunctional triazine compound is employed with a difunctional carbon aromatic material the following empirical formula would represent the resin:

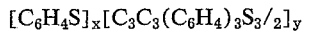

The actual structure would be represented by a diagrammatic formula similar to the one above for the resin containing the trifunctional carbon aromatic units, but of course with T replacing P and with the linear T's replaced by B's.

Other combinations such as the use of both trifunctional triazine units and trifunctional carbon aromatic units with difunctional units, either carbon aromatic or triazine type, can obviously be made but the above examples illustrate the types of combinations contemplated within my invention.

What is claimed is:

1. A method of making a polysulfide polymer comprising reacting together in a sealed container sulfur, a compound selected from the group consisting of alkali metal and alkaline earth metal carbonates, sulfides, and oxides, at least one nuclearly halogen disubstituted aromatic compound, and a triphenyl triazine in which at least one phenyl group has a nuclearly substituted bromine, chlorine, or iodine, and in which the reactant mixture is heated to from 270° C. to 360° C. for at least 5 hours to complete the reaction.

2. The polymeric reaction product resulting from the method defined in claim 1.

References Cited by the Examiner

UNITED STATES PATENTS

| | | | |
|---|---|---|---|
| 2,513,188 | 6/1950 | Macallum | 260—79.1 |
| 2,538,941 | 1/1951 | Macallum | 260—79.1 |
| 2,640,047 | 5/1953 | Thurston | 260—79 |
| 3,203,550 | 8/1965 | Schaefer | 260—248 |

DONALD E. CZAJA, *Primary Examiner.*

LEON J. BERCOVITZ, *Examiner.*

M. I. MARQUIS, *Assistant Examiner.*